United States Patent
Aitken et al.

(10) Patent No.: US 9,799,914 B2
(45) Date of Patent: Oct. 24, 2017

(54) BARRIER LAYER FOR THIN FILM BATTERY

(75) Inventors: Bruce Gardiner Aitken, Corning, NY (US); Todd Parrish St. Clair, Painted Post, NY (US); James R Lim, Painted Post, NY (US); Prantik Mazumder, Ithaca, NY (US); Mark Alejandro Quesada, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 1803 days.

(21) Appl. No.: 12/362,063

(22) Filed: Jan. 29, 2009

(65) Prior Publication Data

US 2010/0190051 A1    Jul. 29, 2010

(51) Int. Cl.

| | |
|---|---|
| *H01M 4/13* | (2010.01) |
| *H01M 10/052* | (2010.01) |
| *H01M 2/10* | (2006.01) |
| *H01M 6/40* | (2006.01) |
| *H01M 10/0585* | (2010.01) |
| *H01M 10/0525* | (2010.01) |
| *H01M 10/0565* | (2010.01) |

(52) U.S. Cl.
CPC ....... *H01M 10/052* (2013.01); *H01M 2/1061* (2013.01); *H01M 6/40* (2013.01); *H01M 10/0585* (2013.01); *H01M 10/0525* (2013.01); *H01M 10/0565* (2013.01); *Y10T 29/49108* (2015.01)

(58) Field of Classification Search
CPC . H01L 2224/48091; H01L 2924/00014; H01L 51/5246; H01L 2924/181; H01L 2225/301; H01L 2924/00012; H01L 51/0024; H01L 31/048; H01L 33/483; H01L 33/504; H01L 33/505; H01L 25/0753; H01L 27/156; H01L 33/501; H01L 33/502; H01L 33/507
USPC ................ 429/322, 223, 224, 221, 231.95
See application file for complete search history.

(56) References Cited

U.S. PATENT DOCUMENTS 5,355,089 A  *  10/1994  Treger ......................... 324/435
5,681,666 A      10/1997  Treger et al. .................. 429/90
(Continued)

FOREIGN PATENT DOCUMENTS

EP    1892775        2/2008
EP    1892775 A2    2/2008
(Continued)

OTHER PUBLICATIONS

Corning Incorporated U.S. Appl. No. 61/130,506, filed May 30, 2008.

*Primary Examiner* — Patrick Ryan
*Assistant Examiner* — Ben Lewis

(57) ABSTRACT

A thin film battery comprises a substrate, anode and cathode current collector layers formed over the substrate, anode and cathode layers formed over and in electrical contact with respective ones of the current collector layers, and an electrolyte layer formed between the anode and cathode layers. The thin film battery further comprises a barrier layer formed from a material such as tin oxide, tin phosphate, tin fluorophosphate, chalcogenide glass, tellurite glass or borate glass. The barrier layer is configured to encapsulate the thin film battery layers and substantially inhibit or prevent exposure of the thin film battery layers to air or moisture.

30 Claims, 2 Drawing Sheets

(56) References Cited

U.S. PATENT DOCUMENTS

| | | | |
|---|---|---|---|
| 6,764,525 B1 | 7/2004 | Whitacre et al. | 29/623.2 |
| 6,994,933 B1* | 2/2006 | Bates | 429/162 |
| 2004/0106045 A1* | 6/2004 | Ugaji et al. | 429/321 |
| 2004/0185336 A1* | 9/2004 | Ito et al. | 429/152 |
| 2005/0147877 A1* | 7/2005 | Tarnowski et al. | 429/162 |
| 2006/0032046 A1* | 2/2006 | Nathan et al. | 29/623.5 |
| 2007/0040501 A1 | 2/2007 | Aitken et al. | 313/512 |
| 2007/0051620 A1 | 3/2007 | Visco et al. | 204/280 |
| 2007/0229271 A1* | 10/2007 | Shionoiri et al. | 340/572.1 |
| 2007/0243459 A1* | 10/2007 | Jenson et al. | 429/122 |
| 2007/0252526 A1 | 11/2007 | Aitken et al. | 313/512 |
| 2008/0003493 A1* | 1/2008 | Bates | 429/66 |
| 2008/0053519 A1* | 3/2008 | Pearce et al. | 136/252 |
| 2008/0213664 A1* | 9/2008 | Krasnov et al. | 429/220 |
| 2009/0010462 A1* | 1/2009 | Ekchian et al. | 381/312 |
| 2009/0081553 A1* | 3/2009 | Kondo et al. | 429/314 |
| 2009/0159432 A1* | 6/2009 | Kawano et al. | 204/192.15 |
| 2009/0181303 A1* | 7/2009 | Neudecker et al. | 429/209 |

FOREIGN PATENT DOCUMENTS

| | | | |
|---|---|---|---|
| FR | 2862436 | 5/2005 | |
| JP | 2006-216336 | 8/2006 | H01M 10/36 |
| WO | WO2007/021627 A1 | 2/2007 | |
| WO | WO2008/036731 A2 | 3/2008 | |
| WO | WO2008/069930 A2 | 6/2008 | |
| WO | WO2010088454 | 5/2010 | H01M 2/10 |

\* cited by examiner

BARRIER LAYER FOR THIN FILM BATTERY

BACKGROUND AND SUMMARY

The present invention relates generally to materials and processes for sealing thin film batteries, and specifically to a hermetic seal comprising a barrier layer formed from one or more of tin oxide, tin phosphate, tin fluorophosphate, chalcogenide glass, tellurite glass, and borate glass. The materials and processes described herein can be implemented to significantly enhance the efficiency of thin film battery packaging, which can extend battery lifetimes and increase achievable energies and power densities.

Thin film batteries function much in the same way as traditional batteries, but can have a total thickness less than 1 mm (e.g., 0.35 to 0.65 mm) and are suitable, for example, for low-voltage (1.5 to 3.0 V) applications where traditional button cell geometries may be inadequate. Because thin film batteries are rechargeable, their size need be no larger than required to satisfy the energy requirements for a single discharge, thus reducing weight and cost. Further, compared to traditional lithium-ion batteries, which comprise a liquid electrolyte core, thin film batteries have a solid state core that obviates concerns over electrolyte leakage and makes thin film batteries less vulnerable to overheating. Thin film batteries have a large range of operating temperatures that can extend, for example, from as low as −20° C. to as high as 130° C., and can be repeatedly charged and discharged with minimal detrimental effect. Based on these and other properties, thin film batteries have tremendous potential for applications in microelectronics and MEMS industries as active or stand-by power sources.

Due to their ultrathin profile, low thermal mass, ability to operate across a wide temperature range, and fabrication compatibility with existing technologies, thin film batteries are well-suited for a variety of applications including, for example, power sources for diagnostic wafers for semiconductor processing, wireless embedded sensors, smart cards, active radio-frequency identification (RFID) tags, non-volatile memory backup, and implantable medical devices. These small-scale power systems have the potential to enable innumerable new wireless devices, and further applications include cell phones, laptop computers, personal electronic assistants and hybrid communication devices.

In semiconductor applications, thin film batteries can be deposited directly onto chips or chip packages in any desired shape or size. Power-paper batteries, for example, can be printed directly onto thin substrates such as paper, so they can be extremely flexible. Moreover, multiple thin film batteries can be fabricated into high density arrays of discrete units each having an areal footprint of, for example, about 0.25 to 1 mm². Planar thin film batteries can be rolled or stacked into cylindrical or prismatic cell designs that can be packed together into modules. Such configurational flexibility allows multiple batteries to be connected in parallel or in series, depending on the application. By incorporating the barrier layer according to the invention, individually-packaged thin film batteries can be handled during and after device fabrication without adversely affecting failure rates.

Notwithstanding the foregoing, wide scale proliferation of thin film batteries depends on their meeting a number of additional challenges, including improved capacity, lower cycling losses, and increased lifetime. The lifetime of a thin film battery, for instance, can be affected by factors such as the thermal and electrochemical stability of the electrodes and the electrolyte, as well as the hermeticity of the battery package.

The desire for hermeticity is motivated primarily by the reactive nature of commonly-used alkali metal-based anodes, such as Li metal or $Li_6C$ and, in particular, the adverse reaction of these materials with air and water. Specifically, the reactions with air or water can create unsafe conditions and detrimentally compromise thin film battery performance. It is therefore desirable to minimize air or water exposure of the thin film battery layers and, in particular, the anode material both during and after fabrication.

Barrier layer materials and processes to provide barrier layer materials for hermetically packaging thin film batteries are known. A goal of such barrier layers is to significantly reduce oxygen and water permeability such that the anode remains unexposed and intact even at elevated temperatures and in humid conditions.

In view of the foregoing, it would be advantageous to provide an improved thin film battery barrier layer capable of protecting a lithium thin film battery under aggressive operating conditions. For example, conditions can include operation for 1000 hrs or longer in 85% relative humidity at 85° C.

These and other aspects and advantages of the invention can be achieved by a materials system and process for providing high performance encapsulation for thin film batteries. Such encapsulation can extend the lifetime of thin film batteries and particularly alkali metal-based thin film batteries by ensuring that the external environment is not the leading cause of failure. Specifically, high performance encapsulation layers according to the invention are incorporated into thin film batteries to hermetically seal the materials layers used to form the batteries and, specifically, alkali metal-based anode materials.

According to further embodiments, the choice of the barrier layer material(s) and the processing conditions for incorporating the barrier layer materials are sufficiently flexible that the thin film battery is not adversely affected by the barrier layer. Exemplary barrier layer materials include tin oxide, tin phosphate, tin fluorophosphate, chalcogenide glass, tellurite glass and borate glass. In embodiments, the barrier layers can be derived from room temperature sputtering of one or more of the foregoing materials or precursors for these materials, though other thin film deposition techniques can be used. Further, the deposition process can be tuned to control barrier layer thickness, conformality and stoichiometry. In order to accommodate various thin film battery architectures, deposition masks can be used to produce a suitably patterned barrier layer. Alternatively, conventional lithography and etching techniques can be used to form a patterned barrier layer from a uniform layer.

Additional features and advantages of the invention will be set forth in the detailed description which follows, and in part will be readily apparent to those skilled in the art from that description or recognized by practicing the invention as described herein, including the detailed description, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION

Figure 1:
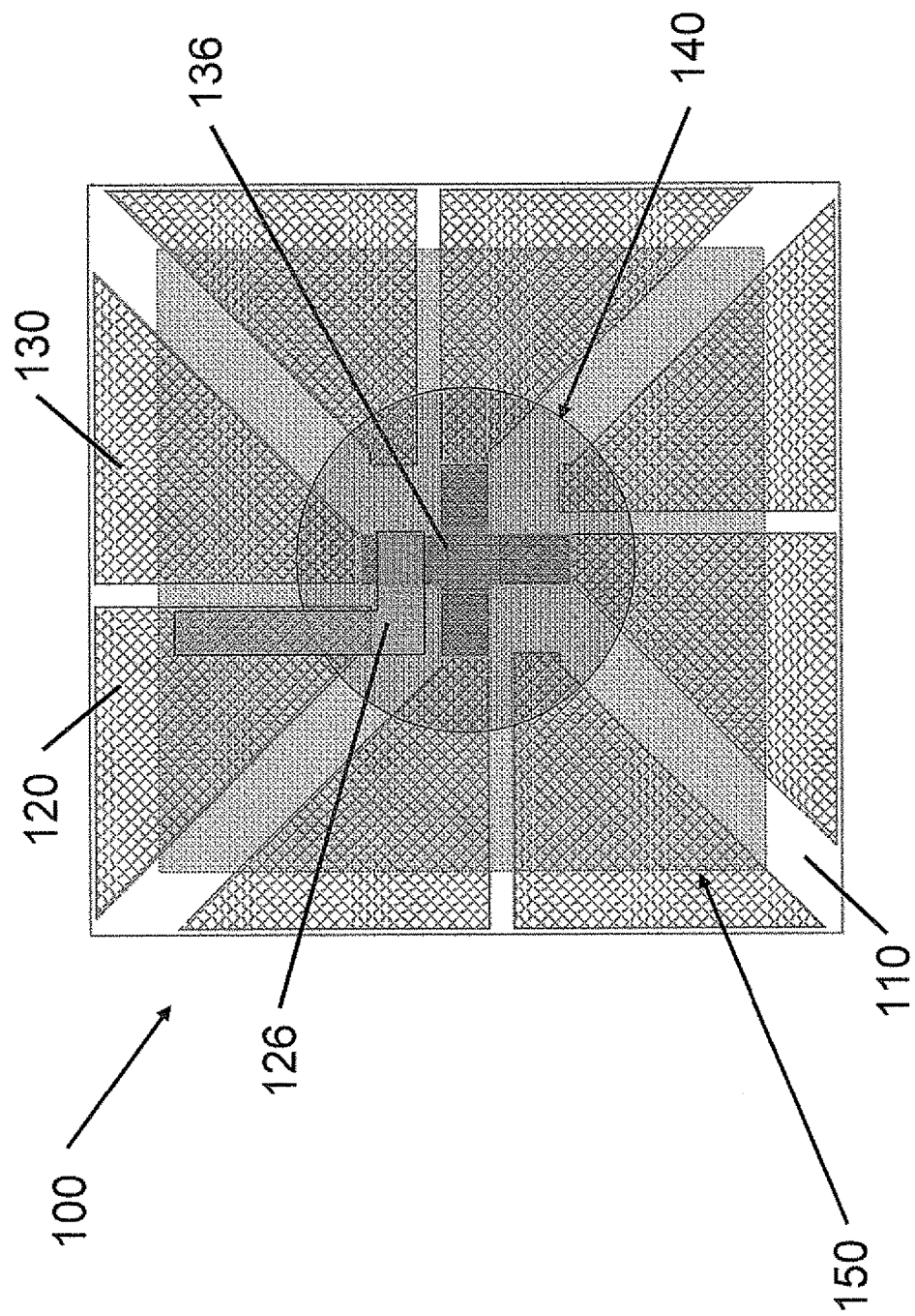
FIG. 1 is a schematic plan view of a thin film battery according to embodiments; and, FIG. 2 is a schematic cross-sectional view of a thin film battery according to embodiments.

As used herein, the singular articles "a," "an" and "the" include plural referents unless the context clearly dictates otherwise. Thus, for example, reference to a "barrier layer material" includes examples having two or more such "materials" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" in a particular way. In this respect, such a component is "configured" to embody a particular property, or function in a particular manner, where such recitations are structural recitations as opposed to recitations of intended use. More specifically, the references herein to the manner in which a component is "configured" denotes an existing physical condition of the component and, as such, is to be taken as a definite recitation of the structural characteristics of the component.

The invention relates to a thin film battery comprising a substrate, an anode current collector and a cathode current collector formed on the substrate, anode and cathode layers in respective electrical contact with the current collector layers, and an electrolyte layer formed between and configured to isolate the anode from the cathode. A hermetic seal (barrier layer) is formed over the current collector layers, anode, cathode and electrolyte layers and is configured to protect each of the thin film battery layers from exposure to air ($O_2$ and $N_2$) and/or moisture. As used herein, "formed over" means that there is at least some degree of overlap between the respective layers, with or without the presence of one or more intervening layers.

A hermetic layer is a layer which, for practical purposes, is considered substantially airtight and substantially impervious to moisture. By way of example, the barrier layer can be configured to limit the transpiration (diffusion) of oxygen to less than about $10^{-2}$ $cm^3/m^2/day$ (e.g., less than about $10^{-3}$ $cm^3/m^2/day$), and limit the transpiration (diffusion) of water to about $10^{-2}$ $g/m^2/day$ (e.g., less than about $10^{-3}$, $10^{-4}$, $10^{-5}$ or $10^{-6}$ $g/m^2/day$). In embodiments, the barrier layer substantially inhibits air and water from contacting the anode layer.

According to one embodiment, a method for forming a thin film battery comprises forming an anode current collector layer and a cathode current collector layer on a substrate, forming a cathode layer over the cathode current collector layer, forming an electrolyte layer over the cathode layer, forming an anode layer over both the anode current collector layer and the electrolyte layer, and forming a barrier layer over the anode layer and the electrolyte layer.

Figure 2:
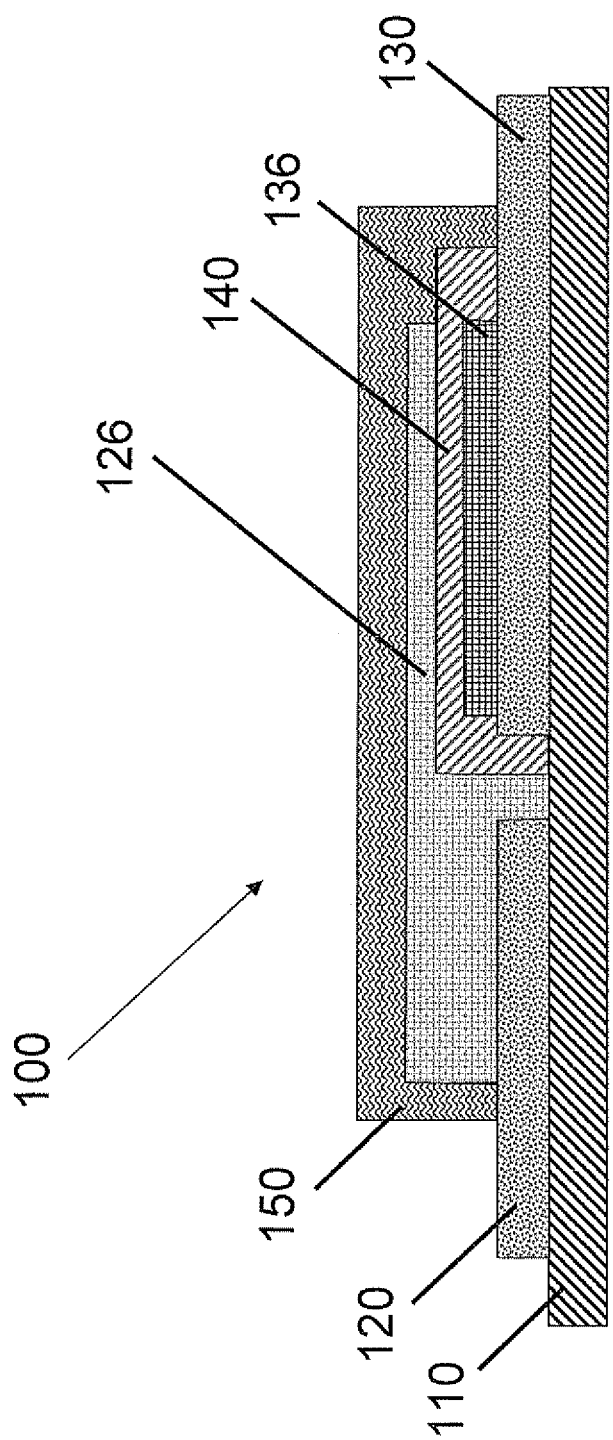

A schematic of one example thin film battery architecture is shown in FIGS. 1 and 2 where FIG. 1 is a plan view and FIG. 2 is a corresponding cross-sectional view of a portion of the thin film battery. Referring to FIG. 2, thin film battery 100 includes a substrate 110 having a pattern of indium tin oxide (ITO) formed on one side thereof. The patterned ITO layer forms both an anode current collector layer 120 and a cathode current collector layer 130, each having formed thereover a respective anode layer 126 and cathode layer 136. In lieu of ITO, any suitable transparent conducting oxide can be used for the anode and cathode current collector layers. According to an embodiment, the current collector layers can each comprise a plurality of spaced conducting lines. The anode layer 126 can comprise, for example, lithium metal or lithium carbide ($Li_6C$), and the cathode layer 136 can comprise, for example, $LiCoO_2$, $LiMnO_2$, $LiFeO_2$, $LiNiO_2$ and/or $V_2O_5$.

A solid state electrolyte layer 140 is formed in contact with each of the anode layer 126 and the cathode layer 136 and is configured to electrically isolate the anode layer from the cathode layer. The electrolyte layer can comprise, for example, lithium phosphorus oxynitride (LiPON).

A barrier layer 150 is formed over both the anode layer and the cathode layer so as to protect each from exposure to ambient air ($O_2$) or water. The barrier layer can be formed from one or more of tin oxide, tin phosphate, tin fluorophosphate, tungsten-doped tin fluorophosphate, chalcogenide glass, tellurite glass or borate glass. In an embodiment, the barrier layer can be a $Sn^{2+}$-containing inorganic oxide material such as, for example, SnO or a mixture comprising SnO and $P_2O_5$ or $BPO_4$. For example, the barrier layer can comprise 60-100 mol % SnO (e.g., 60, 70, 80, 90 or 100 mol %) and 0-40 mol % $P_2O_5$ (e.g., 0, 10, 20, 30 or 40 mol %). In further embodiments, a $Sn^{2+}$-containing inorganic oxide comprises 59-85 wt. % Sn, 0-13 wt. % P, 6-25 wt. % O, and 0-12 wt. % F.

The barrier layer composition can include dopants such as tungsten and/or niobium but can be substantially free of heavy metals and other environmentally undesirable materials. If used, the tungsten and/or niobium dopant concentration can range from about 0.01 to 15 wt. %. Exemplary tin fluorophosphate glasses can comprise 20-85 wt. % Sn, 2-20 wt. % P, 10-36 wt. % 0, 10-36 wt. % F, and 0-5 wt. % Nb. In embodiments, in the foregoing composition the sum of Sn+P+O+F is at least 75%. An example niobium-doped tin fluorophosphate glass comprises 22.42 wt. % Sn, 11.48 wt. % P, 42.41 wt. % O, 22.64 wt. % F and 1.05 wt. % Nb. An example tungsten-doped tin fluorophosphate glass comprises 55-75 wt. % Sn, 4-14 wt. % P, 6-24 wt. % O, 4-22 wt. % F, and 0.15-15 wt. % W.

Additional aspects of the foregoing barrier layer materials are disclosed in commonly-owned U.S. Application No. 61/130,506 and U.S. Patent Application Publication Nos. 2007/0252526 and 2007/0040501, the entire contents of which are hereby incorporated herein by reference in their entirety.

The barrier layers according to the present invention can protect Li metal and Li ion-based thin film batteries from the external environment, thus substantially minimizing or avoiding adverse reactions with moisture and/or air, and extending battery lifetime. In addition, the barrier layers enable efficient and space-saving packaging and, compared with traditionally-sealed thin film batteries, can be used to produce thin film batteries having enhanced volumetric energy, gravimetric energy and power density.

Prior to encapsulation, a thin film battery according to embodiments can have a total thickness in a range of about 320 nanometers to 100 micrometers. For example, an unencapsulated thin film battery can have a total thickness of about 2 to 10 micrometers (e.g., about 2, 3, 4, 5, 6, 7, 8, 9 or 10 micrometers). Further, within the thin film battery architecture, the individual layer thickness can vary. At a lower end of the total thickness range, for example, a thin film battery can include current collector layers having a thickness of about 20 nm, and anode, cathode and electrolyte layers having a thickness of about 100 nm each.

The current collector layers can have a thickness of about 20 to 1000 nm (e.g., about 20, 50, 100, 150, 200, 250, 300, 350, 400, 450, 500, 550, 600, 650, 700, 750, 800, 850, 900, 950 or 1000 nm), the cathode layer can have a thickness of about 5 to 5000 nm (e.g., about 5, 10, 20, 50, 100, 200, 300, 400, 500, 1000, 2000, 3000, 4000 or 5000 nm), and the anode layer can have a thickness of about 100 to 2000 nm (e.g., about 100, 200, 300, 400, 500, 1000 or 2000 nm).

The barrier layer can have an average thickness of about 2 to 5 micrometers (e.g., about 2, 3, 4 or 5 micrometers) but, according to embodiments, can range in thickness from about 100 nm to 35 micrometers (e.g., about 100, 200, 500, 1000, 2000, 5000, 10000, 20000 or 35000 nm).

The attendant process for forming hermetic seals for thin film batteries is flexible, allowing for the encapsulation of numerous thin film battery architectures including, for example, 2-dimensional and 3-dimensional patterned thin film battery arrays, and is advantageously compatible with the underlying thin film battery layers. Moreover, the process is simple and can be adapted to include a number of different hermetic seal compositions, which facilitates compatibility with both the anode and the electrolyte layer.

The barrier layers according to the present invention can substantially inhibit rapid alkali-metal oxidation and thus enable large energy-densities and re-chargeability of solid-state electrolyte lithium-based battery architectures. The ultra-thin film barrier layer permits the production of thin film batteries in a patterned format that reduces the "run-away" chemical chain reactions that can damage traditional large-volume lithium-based batteries. Notably, by reducing the lithium metal content in any one single thin film battery and coupling together arrays of multiple patterned thin film batteries on a given substrate, it is possible to achieve adequate energy densities while minimizing the potential for catastrophic failure. In the event of device breakage, for example, any particle crack or fault line will propagate through only a small volume of lithium-containing material, resulting in minor, contained oxidation.

Thin film batteries comprising a barrier layer according to the present invention can operate for extended lifetimes under dry or humid conditions (e.g., 0 to 100% relative humidity), across a wide range of temperatures (e.g., −20 to 130° C.). For example, operation at a relative humidity greater than 50, 60, 70, 80 or 90% is possible at an operation temperature greater than 50, 60, 70, 80 or 90° C. Achievable lifetimes can extend to 1000 hours or more.

Each of the layers (e.g., current collectors, anode, cathode, electrolyte and barrier layer) can be formed using conventional vacuum deposition techniques, which enables direct encapsulation of reactive layers prior to any ambient exposure. Exemplary methods include chemical or physical vapor deposition, flash evaporation, laser ablation and co-evaporation. Physical vapor deposition (PVD) methods can include, for example, reactive or non-reactive sputtering processes. With sputtering, any conventional power supply can be used to generate the ion (e.g., $Ar^+$) current to the target, for example, magnetron, DC, RY or pulsed DC power supplies. Suitable sputter targets for the various barrier layer compositions can be formed as melted powder or pressed powder targets.

In some applications, the composition of the sputter target may differ from the composition of the resulting thin film. In the tin fluorophosphate system, for example, the resulting thin film composition may be depleted with respect to both fluorine and phosphorous relative to the corresponding sputter target composition due to, for example, disparate sputter rates and/or incorporation efficiencies of each of tin, oxygen, fluorine and phosphorous. By way of example, select tin fluorophosphate sputter target compositions and the corresponding thin film barrier layer compositions (in mole %) are listed in Table 1.

TABLE 1

Sputter target and corresponding thin film compositions

| Sample | | SnO [mol %] | $SnF_2$ [mol %] | $P_2O_5$ [mol %] |
|---|---|---|---|---|
| 1 | Target | 20 | 60 | 20 |
| | Barrier Layer | 69 | 22 | 9 |
| 2 | Target | 30 | 50 | 20 |
| | Barrier Layer | 67 | 22 | 11 |
| 3 | Target | 35 | 45 | 20 |
| | Barrier Layer | 63 | 23 | 14 |
| 4 | Target | 40 | 40 | 20 |
| | Barrier Layer | 72.5 | 17.5 | 10 |
| 5 | Target | 40 | 45 | 15 |
| | Barrier Layer | 69 | 26 | 5 |
| 6 | Target | 47.5 | 32.5 | 20 |
| | Barrier Layer | 73 | 15.5 | 11.5 |

EXAMPLES

The invention will be further clarified by the following example. Again with reference to FIG. 2, a method of forming a thin film battery 100 comprising a barrier layer includes providing a substrate 110 having formed thereon separate patterned layers of indium tin oxide, which serve as both the anode and cathode current collectors 120, 130.

A cathode layer 136 is formed over the cathode current collector 130. The cathode layer 136, which may be formed by sputtering a pressed powder target of cathode material through a suitably patterned mask, may comprise $LiCoO_2$ or, alternatively, $LiMnO_2$, $LiFeO_2$, $LiNiO_2$ or $V_2O_5$, for example. In an RF magnetron sputter tool, exemplary sputtering conditions for forming a $LiCoO_2$ cathode layer include a power of about 50 W, a chamber pressure of about 3 mTorr (e.g., 0.5 to 5 mTorr), and a sputter time of 1-3 hours in 100% pure argon. During sputtering of the target, the substrate can be maintained at a temperature of about −15-120° C. In order to prevent short circuiting of the resulting thin film battery, a mask for the cathode layer should be configured such that contact between the cathode layer 136 and the anode current collector 120 is avoided. After forming the cathode layer, the structure can be annealed under conditions effective to crystallize the cathode layer (e.g., 300° C. for 2 hours in air).

After forming the cathode layer, the electrolyte layer 140 is formed, for example, by sputtering a pressed powder sputter target through a suitable mask. Exemplary sputtering conditions for forming the electrolyte layer include a power of about 50 W, a chamber pressure of about 0.5 mTorr (e.g., 0.1 to 5 mTorr), and a sputter time of 1-3 hours in 100% pure nitrogen. In a pure nitrogen atmosphere, a sputter target comprising $LiPO_4$ can be used to form an electrolyte layer comprising LiPON via reactive sputtering.

After forming the electrolyte layer 140, an anode layer 126 is formed over the anode current collector 120. Advantageously, the anode layer 126 is also formed over the electrolyte layer 140 so as to maximize the areal registry (overlap) between the anode layer 126 and the underlying cathode layer 136. In the example of an anode layer formed using lithium metal, the anode layer can be formed by resistively heating a crucible containing lithium. The evaporated lithium can be deposited directly onto the anode current collector and electrolyte layers via a suitable mask.

A barrier layer 150 is formed over the cathode, anode and electrolyte layers so as to completely encapsulate these layers. Advantageously, the barrier layer is formed using a material having an inherently low permeability to oxygen and water and the barrier layer, once formed, is substantially free of defects that would otherwise permit oxygen and/or water from passing therethrough.

During sputtering of the barrier layer, the vacuum chamber is preferably substantially free of oxygen ($O_2$) and moisture ($H_2O$). Sputtering times to form the barrier layer can range from 45 minutes to 24 hours. Deposition rates of the barrier layer can range from about 0.1-10 Angstroms/second. The barrier layer material is advantageously nonreactive toward the cathode, anode and electrolyte materials.

The barrier layer 150 can be formed from materials including tin oxide, tin phosphate, tin fluorophosphate, chalcogenide glass, tellurite glass and borate glass. Materials used to form the barrier layer can have a melting temperature less than about 1000° C. (e.g., less than about 1000, 900, 800, 700, 600, 500 or 400° C.). The barrier layer can comprise a single, homogeneous layer, and may be an amorphous layer or a crystalline layer. For example, the barrier layer may comprise of consist of amorphous tin oxide (e.g., SnO). Alternatively, the barrier layer can comprise a composite layer. A composite barrier layer may comprise one or more spatially-varying properties, including composition, degree of crystallinity, crystal grain size and shape, crystalline orientation, refractive index, density, type and number of defects, etc.

After forming the barrier layer, an optional passivation step (e.g., consolidating heat treatment) can be used to repair defects in the barrier layer that may have been created during barrier layer formation. Such defects may include pinholes, cracks, etc. The passivation step, if used, is preferably benign toward the underlying thin film battery layers and can include, for example, exposure of the barrier layer to a controlled temperature, moisture content and/or oxygen content. The passivation can result in the formation of a discrete passivation layer in an exposed surface of the barrier layer.

By way of example, passivation of an as-formed barrier layer can be carried out by post-deposition treatment of the thin film battery in a steam oven (e.g., 85° C., 85% relative humidity) or a water bath (e.g., room temperature). Alternatively, because the vacuum chamber used to form the barrier layer may not be 100% free of oxygen or water, passivation can occur in situ (i.e., during formation of the barrier layer via reaction of the oxygen and/or water with the nascent growing film). Such in situ passivation may be continued and even accelerated in post-depositing processing using the steam or water bath methods discussed above.

The passivation layer, if formed, may comprise an amorphous layer or a crystalline layer and can be formed by oxidizing a near surface region of the barrier layer. Thus, a passivation layer can be formed via suitable surface modification of the barrier layer. In the example of a barrier layer comprising amorphous tin oxide (e.g., SnO), the passivation layer may comprise crystalline tin oxide (e.g., $SnO_2$). Oxidation of the barrier layer surface can result in a passivation layer having a thickness of about 100 nm to 1 micrometers. A ratio of the passivation layer thickness to the total barrier layer thickness (passivation layer+underlying barrier layer) can range from 0 to about 50% (e.g., 0, 1, 2, 5, 10, 15, 20, 25, 30, 35, 40, 45 or 50%).

In embodiments, so as to minimize contamination of the thin film battery and exposure to air and/or moisture during fabrication, the film forming steps, annealing steps and optional passivation steps can be carried out in a single vacuum chamber or cluster tool. With such apparatus, it is possible to conduct a series of film formation steps without a vacuum break until after formation of the barrier layer. In a cluster tool, for example, although one or more internal vacuum breaks may expose various interlayers of a thin film battery to inert environments (e.g., during transport between chambers), it can be advantageous to avoid a vacuum break that results in the exposure of these layers to elevated (e.g., ambient) concentrations of air and/or moisture. Thus, by using a cluster tool, formation of the anode current collector layer, cathode current collector layer, cathode layer, anode layer, electrolyte layer and barrier layer can be performed without exposure of any of these layers to ambient conditions.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A thin film battery comprising:
   a substrate;
   an anode current collector layer and a cathode current collector layer formed on the substrate;
   a cathode layer formed over the cathode current collector layer,
   an electrolyte layer formed over the cathode layer;
   an anode layer formed over both the anode current collector layer and the electrolyte layer, and
   a single layer barrier layer formed over and in physical contact with each of the anode layer and the electrolyte layer, wherein the barrier layer comprises a glass material selected from the group consisting of SnO, tin phosphate, tin fluorophosphate, chalcogenide glass, tellurite glass and borate glass.

2. The thin film battery according to claim 1, wherein the anode and cathode current collector layers comprise indium tin oxide.

3. The thin film battery according to claim 1, wherein the anode and cathode current collector layers each comprise a plurality of spaced conducting lines.

4. The thin film battery according to claim 1, wherein the cathode layer comprises $LiCoO_2$, $LiMnO_2$, $LiFeO_2$, $LiNiO_2$ and/or $V_2O_5$.

5. The thin film battery according to claim 1, wherein the anode layer comprises lithium metal or $Li_6C$.

6. The thin film battery according to claim 1, wherein the electrolyte layer comprises LiPON.

7. The thin film battery according to claim 1, wherein the barrier layer has an average thickness of about 100 nanometers to 35 micrometers.

8. The thin film battery according to claim 1, wherein the barrier layer has an average thickness of about 2 to 5 micrometers.

9. The thin film battery according to claim 1, wherein the barrier layer is an amorphous layer.

10. The thin film battery according to claim 1, wherein the barrier layer is configured to substantially inhibit air and water from contacting the anode layer.

11. The thin film battery according to claim 1, wherein the barrier layer is configured to limit diffusion therethrough of oxygen to less than about $10^{-2}$ cm$^3$/m$^2$/day, and limit diffusion of water therethrough to less than about $10^{-2}$ g/m$^2$/day.

12. The thin film battery according to claim 1, wherein a near surface region of the barrier layer is oxidized to form a passivation layer.

13. The thin film battery according to claim 1, wherein a near surface region of the barrier layer is oxidized to form a crystalline passivation layer.

14. The thin film battery according to claim 1, wherein the barrier layer consists of a material selected from the group consisting of tin oxide, tin phosphate, tin fluorophosphate, chalcogenide glass, tellurite glass and borate glass.

15. The thin film battery according to claim 1, wherein the barrier layer is formed over and in physical contact with at least a portion of each of the anode current collector layer and the cathode current collector layer.

16. The thin film battery according to claim 1, wherein the barrier layer is a conformal layer.

17. A method for forming a thin film battery, comprising:
    forming an anode current collector layer and a cathode current collector layer on a substrate;
    forming a cathode layer over the cathode current collector layer,
    forming an electrolyte layer over the cathode layer;
    forming an anode layer over both the anode current collector layer and the electrolyte layer, and
    forming a single layer barrier layer over and in physical contact with each of the anode layer and the electrolyte layer, wherein the barrier layer comprises a glass material selected from the group consisting of SnO, tin phosphate, tin fluorophosphate, chalcogenide glass, tellurite glass and borate glass.

18. The method according to claim 17, wherein after forming the cathode layer but prior to forming the electrolyte layer, the cathode layer is heated under conditions effective to crystallize the cathode layer.

19. The method according to claim 17, wherein the barrier layer is formed by sputtering.

20. The method according to claim 17, wherein the barrier layer is formed by room temperature sputtering.

21. The method according to claim 17, wherein the barrier layer has an average thickness of about 100 nanometers to 35 micrometers.

22. The method according to claim 17, wherein the barrier layer has an average thickness of about 2 to 5 micrometers.

23. The method according to claim 17, wherein the barrier layer is amorphous.

24. The method according to claim 17, further comprising passivating the barrier layer.

25. The method according to claim 17, further comprising passivating the barrier layer by exposing the barrier layer to at least one of a controlled temperature, moisture content or oxygen content.

26. The method according to claim 17, further comprising oxidizing a near surface region of the barrier layer to form a crystalline passivation layer.

27. The method according to claim 17, where the forming of at least the anode layer and the barrier layer are carried out in a single vacuum chamber or cluster tool without exposure to ambient conditions between formation of the anode layer and barrier layer.

28. The method according to claim 17, wherein the forming of the anode current collector layer, cathode current collector layer, cathode layer, anode layer, electrolyte layer and barrier layer are carried out in a single vacuum chamber or cluster tool without exposure to ambient conditions between formation of any of said layers.

29. The method according to claim 17, wherein the barrier layer consists of a material selected from the group consisting of tin oxide, tin phosphate, tin fluorophosphate, chalcogenide glass, tellurite glass and borate glass.

30. The method according to claim 17, further comprising forming the barrier layer over and in physical contact with at least a portion of each of the anode current collector layer and the cathode current collector layer.

* * * * *